March 18, 1941.  A. C. KOENIG  2,235,218
DIFFUSION APPARATUS
Filed Sept. 30, 1939

INVENTOR
ARTHUR C. KOENIG

BY

ATTORNEYS

Patented Mar. 18, 1941

2,235,218

UNITED STATES PATENT OFFICE 2,235,218

DIFFUSION APPARATUS

Arthur C. Koenig, Cuyahoga Falls, Ohio, assignor to The Firestone Tire & Rubber Company, Akron, Ohio, a corporation of Ohio Application September 30, 1939, Serial No. 297,411

3 Claims. (Cl. 261—121)

This invention relates to apparatus for diffusing a fluid into another fluid, more especially to apparatus for diffusing ammonia into bulked latex.

In the rubber industry, considerable quantities of latex, which is the natural milk, or liquid form in which rubber is derived from the rubber trees, are handled and stored for appreciable lengths of time. This material has a tendency to become sour, and finally to coagulate or solidify. That is, the rubber carried in suspension in the original fluid has collected and precipitated out of the liquid. To prevent this, a substance such as ammonia is placed in the latex and this acts to preserve the material until it is ready to be used. Even then, the preservative tends to vaporize from the latex, or be required in larger amounts, if the storage of the latex is prolonged.

One general object of this invention is to provide suitable apparatus for diffusing a fluid, such as ammonia, into another fluid, such as latex. Further objects of the invention are to provide diffusing apparatus which will function even though totally submerged in a liquid; to provide apparatus which diffuses one fluid into the other in very fine portions or quantities; and to provide means from which a fluid is distributed substantially uniformly into the surrounding medium.

The above and other objects will be manifest from the following specification which will be described with particular reference to the accompanying drawing, in which.

Figure 1:
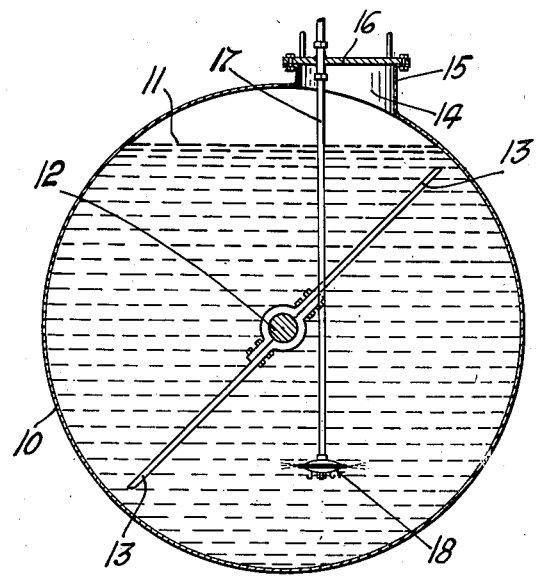
Figure 1 is a vertical elevation, partly in section, of storage apparatus for a fluid, showing apparatus embodying the invention operatively associated therewith.

Referring specifically to Figure 1 of the drawing, a storage tank is shown in which a fluid 11 is received. This tank 10 has a shaft 12 extending axially therethrough with the shaft 12 carrying paddle arms 13 thereon whereby upon rotation of the shaft the fluid 11 is agitated. A manhole, or cleaning aperture 14 is provided in the tank 10 and defined by an outwardly extending tubular member 15 formed on the tank 10. The cleaning aperture 14 is sealed by a manhole cover 16 which is bolted to the tubular member 15.

In order to provide a supply line for the material to be diffused into the contents of the tank 10, a pipe 17 extends through the manhole cover 16 down into the lower portion of the tank 10. A diffuser head of the invention, generally indicated by the numeral 18, is secured to the lower end of the pipe 17. Obviously the positions of the diffuser head and the paddle arms 13 are correlated so that they do not interfere with each other.

Figure 2:
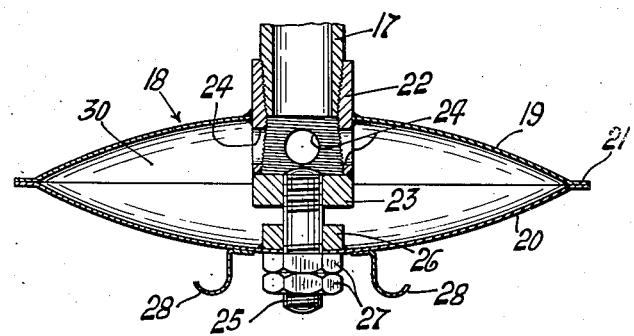
Figure 2 is a sectional elevation of diffusion means embodying the invention.
Figure 3:
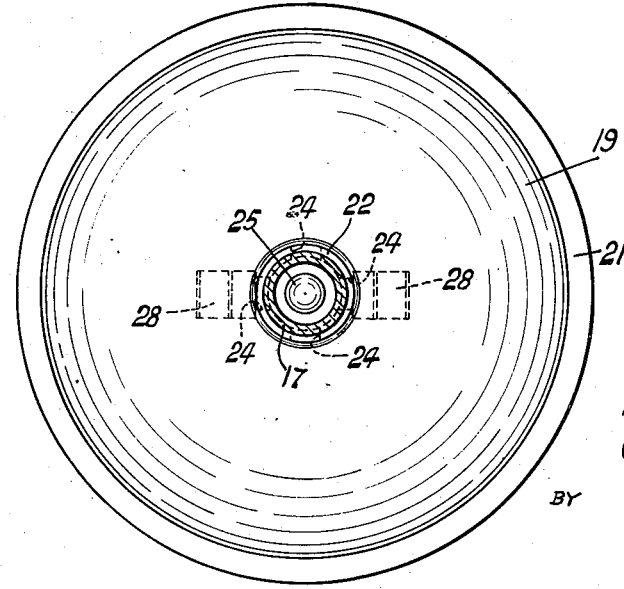
Figure 3 is a plan of the apparatus shown in Figure 2.

The specific construction of the diffuser head 18 is best shown in Figure 2 and this head comprises two concave, slightly flexible, thin-walled disks 19 and 20, which have flat portions 21 at their outer edges. A pipe section 22 is secured to the disk 19 and extends from both sides thereof. The end of the pipe section 22 projecting from the concave side of the disk 19 has a threaded plug, or collar 23 secured thereto. Preferably a plurality of holes 24 are formed in the pipe section 22 adjacent the collar 23 for a purpose hereinafter to be disclosed. Means are provided for securing the disks 19, 20 together to form a chamber 30 therebetween and these means may include a threaded stud, or bolt 25, which extends from both sides of the disk 20. This stud 25 is adapted to engage with the threaded collar 23 carried by the pipe section 22 whereby the flat portions 21 of the disks 19 and 20 can be brought into tight but not positive engagement to form the chamber 30 between the disks. The portion of the pipe 22 extending from the convex side of the disk 19 engages the pipe 17 to supply fluid to the chamber 30 formed by the two disks 19, 20.

By varying the length of the stud 25 in engagement with the threaded collar 23 the compressive pressure upon the flat portions of the disks can readily be varied. In all events, the pressure of the fluid 11 naturally urges the disks together whereby fluid between the disks is held therein. Note that a collar 26 is secured on the inner side of the disk 20 and that the stud 25 is snugly received therein whereby flow of the fluid from the chamber around the stud 25 is prevented. Nuts 27 engage with the projecting end of the stud 25 to control the engagement of the stud with the threaded collar 23. Preferably clips 28 are secured to the disk 20 to serve as a handle therefor. Thus when the diffuser head 18 is freed from the pipe 17 it may readily be carried by the clips 28.

It will be seen that the invention provides apparatus by which a fluid can readily be forced into the chamber 30 through the pipe 22 and the holes 24 therein and then be pushed from the chamber by slightly expanding the outer portions of the disks whereby the fluid escapes through the abutted flat portions 21 of the disks. This escape of fluid from the chamber formed by the disks will occur around substantially the entire periphery of the disks and the fluid is distributed through the material in the tank over a relatively large area whereby no concentration of the diffused fluid will exist adjacent the diffusion head. Thus the complete distribution of the diffused material through the fluid in the tank by the paddle arms 13 is simplified. A further feature of the invention is that the diffuser head is adapted to prevent the fluid 11 from flowing, or backing into the diffuser head. This may be due to the small area of the disks, immediately adjacent the edges from which the material is diffused, exposed to the fluid. The above property of the apparatus is particularly desirable when ammonia is diffused into latex as any latex backing into the diffusion head coagulates and clogs the apparatus. Note that the invention provides a simple, easily controlled apparatus by which a desired amount of a substance, such as ammonia, can readily be obtained in a bulked fluid, such as latex. This greatly simplifies and facilitates the storage of same and is a desirable contribution to the art.

While a written description and illustration of one embodiment of the invention is disclosed herein, it will be understood that various modifications can be made without departing from the scope of the invention as defined in the appended claims.

What is claimed is:

1. An ammonia diffusion head comprising two similar flexible thin-walled concave disks, a hollow member secured to and extending from both sides of one of said disks, a threaded member secured to the end of said hollow member adjacent the concave side of the disk to which said hollow member is secured, and threaded means carried by the remaining one of said disks and protruding from both sides thereof, said threaded means engaging with said threaded member to secure said disks together and form a chamber therebetween.

2. An ammonia diffusion head comprising two similar thin-walled concave disks, a pipe secured to and extending from both sides of one of said disks, a threaded collar secured to the end of said pipe adjacent the concave side of the one of said disks to which it is secured, a bolt carried by the remaining one of said disks and protruding from both sides thereof to engage with said threaded collar to secure said disks together and form a chamber therebetween, and means engaging with the outer end of said pipe to feed a fluid to said chamber whereby sufficient pressure on the fluid will force it out from between the abutted edges of said disks.

3. An ammonia diffusion head comprising two identical thin concave disks, a pipe secured to and and extending from both sides of one of said disks, a threaded collar secured to the end of said pipe adjacent the concave side of the one of said disks to which it is secured, a bolt carried by the remaining one of said disks and protruding from both sides thereof, said bolt being constructed and arranged to engage with said threaded collar to secure said disks together and form a chamber therebetween, the edges of said disks being urged into abutting relationship by said bolt, and means engaging with the outer end of said pipe to feed a fluid to said chamber whereby sufficient pressure upon the fluid will force it therefrom between the abutted edges of said disks.

ARTHUR C. KOENIG.